United States Patent
Lin et al.

(10) Patent No.: US 9,020,797 B2
(45) Date of Patent: Apr. 28, 2015

(54) INTEGRATED CIRCUIT SIMULATION USING ANALOG POWER DOMAIN IN ANALOG BLOCK MIXED SIGNAL

(75) Inventors: Qingyu Lin, San Jose, CA (US); Prabal Kanti Bhattacharya, Cupertino, CA (US); Nan Zhang, Beijing (CN); Zhong Fan, Union City, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 463 days.

(21) Appl. No.: 13/523,492

(22) Filed: Jun. 14, 2012

(65) Prior Publication Data

US 2013/0338991 A1  Dec. 19, 2013

(51) Int. Cl.
*G06F 17/50* (2006.01)
*G06G 7/62* (2006.01)

(52) U.S. Cl.
CPC ........ *G06F 17/5036* (2013.01); *G06F 17/5045* (2013.01); *G06F 17/5022* (2013.01); *G06F 2217/78* (2013.01)

(58) Field of Classification Search
CPC ............ G06F 17/5036; G06F 17/5022; G06F 17/5045; G06F 17/5081; G06F 2217/78
USPC .......................................................... 703/14
See application file for complete search history.

(56) References Cited

U.S. PATENT DOCUMENTS

| | | | |
|---|---|---|---|
| 6,083,271 A * | 7/2000 | Morgan ......................... | 716/120 |
| 7,000,214 B2 * | 2/2006 | Iadanza et al. ................. | 716/104 |
| 7,152,216 B2 * | 12/2006 | Kapoor et al. ................. | 716/103 |
| 7,305,639 B2 * | 12/2007 | Floyd et al. .................... | 716/112 |
| 7,349,835 B2 * | 3/2008 | Kapoor et al. .................. | 703/18 |
| 7,367,006 B1 * | 4/2008 | O'Riordan et al. ........... | 716/102 |
| 7,739,629 B2 * | 6/2010 | Wang et al. .................... | 716/136 |
| 8,135,571 B2 * | 3/2012 | Cassani et al. ................. | 703/13 |
| 2008/0184181 A1 * | 7/2008 | Chetput et al. .................... | 716/7 |
| 2010/0064271 A1 * | 3/2010 | Chen ................................. | 716/5 |
| 2011/0083114 A1 * | 4/2011 | Chetput et al. ................ | 716/106 |

OTHER PUBLICATIONS

Hartong et al, "Real Valued Modeling for Mixed Signal Simulation", Product Version IES 8.2, Cadence Design Systems, Inc., Jan. 2009.*
Power Forward Initiative, "A Practical Guide to Low-Power Design-User Experience with CPF", published on or before Mar. 23, 2008.*

(Continued)

*Primary Examiner* — Mary C Jacob
(74) *Attorney, Agent, or Firm* — Kenyon & Kenyon LLP

(57) ABSTRACT

A method is provided that comprises a circuit design that includes multiple design blocks; a power intent specification file that defines a power domain within the circuit design and that identifies design instances within the power domain and that defines a control function to selectively transition the defined power domain between multiple respective power supply values; using a digital simulator to simulate operation of the digital representation while using an analog simulator to simulate operation of the analog representation; wherein simulating the digital representation includes transitioning the defined power domain between supply values from among the multiple respective supply values; wherein simulating the analog representation includes periodically storing in a storage location a power supply value currently in use during digital simulation of the digital representation; and wherein simulating the analog representation includes using the stored currently in use power supply value to supply voltage to the analog representation.

21 Claims, 12 Drawing Sheets

(56) References Cited

OTHER PUBLICATIONS

Chickermane et al, "A Power-Aware Test Methodology for Multi-Supply Multi-Voltage Designs", International Test Conference, 2008.*

Kahn, Neyaz, "Mixed-Signal Verification of Dynamic Adaptive Power Management in Low Power SoC", Proceedings of the Design and Verification Conference and Exhibition, 2010.*

"Lower-Power Simulation", Chapter 11 Power Aware Modeling, Low-Power Simulation Guide, ver10.2, pp. 271, (Sep. 2011), 271-344.

"Power domain", Common Power Format Language Reference, ver 1.1, (Oct. 2010), 17.

"Section 7.5 Connect Modules", Verilog-AMS Language Reference Manual, ver 2.3, Retrieved from the Internet: <URL:http://www.verilog.org/verilog-ams/htmlpages/public-docs/lrm/2.3/VAMS-LRM-2-3.pdf>, (Aug. 4, 2008), 159-160.

"Update_power_domain", Common Power Format Language Reference, ver 1.1, (Oct. 2010), 205-209.

* cited by examiner

300

```
# CPF file:
# Power Domain
create_power_domain -name pd1 -instances {dinst1 ainst1} -shutoff_condition pso1

# Specify global power supply and ground
update_power_domain -name pd1 -user_attributes {amscpf_power_supply {ainst1.vdd} \
                                                amscpf_power_ground {ainst.vss} }
```

```
//cds_amscpf_pd_link.vams file:        // Power Supply Module
module cds_amscpf_pd_link();           // create global module for amscpf
    real rvdd1;                        // create local real variable
    electrical avdd1, avss1;           // create local electrical net
    initial begin
        $lps_link_power_domain_voltage(rvdd1, "top.pd1");
    end
    analog begin                       // convert real to electrical
        V(avdd1) <+ transition(rvdd1);
        V(avss1) <+ 0;
    end
endmodule
```

FIG. 5A

```
//cds_amscpf_pd_link.scs file: // connect verilog-AMS OOMR with SPICE OOMR
    connect cds_amscpf_pd_link.avdd1 top.ainst1.vdd
    connect cds_amscpf_pd_link.avss1 top.ainst1.vss
```

```
//cds_amscpf_pd_link.vams file:        // Power Supply Module
real rvdd, rvdd2;                      // create local real variable
real rvss1, rvss2;                     // create local real variable
module cds_amscpf_pd_link();           // create global module for amscpf
        initial begin
                $lps_link_power_domain_voltage(rvdd1, "top.pd1");
        end
        always @(rvdd1) top.ainst1.vdd = rvdd1;
        assign top.ainst1.vss = 0;
endmodule
```

FIG. 10

```
//cds_amscpf_pd_link.vams file:        // Power Supply Module
module cds_amscpf_pd_link();           // create global module for amscpf
        real rvdd, rvdd2;              // create local real variable
        real rvss1, rvss2;             // create local real variable
        initial begin
                $lps_link_power_domain_voltage(rvdd1, "top.pd1");
        end
        assign top.ainst1.vdd = rvdd1;
        assign top.ainst1.vss = 0;
endmodule
```

FIG. 11

```
------------------------------------------------------------
set_module_model ana1
        create_power_domain -name apd1 -boundary_parts {in out} -default
        update_power_domain -name apd1 -primary_power_net vdd -primary_ground_net vss \
            -user_attributes {amscpf_power_supply {vdd} amscpf_power_ground {vss}}
end_macro_model set_instance ainst1 -domain_mapping {{apd1 pd1}} -model ana1
------------------------------------------------------------
```

FIG. 12A

```
------------------------------------------------------------
set_module_model ana1
        create_power_domain -name apd1 -boundary_parts {in out} -default
        update_power_domain -name apd1 -primary_power_net vdd -primary_ground_net vss
end_macro_model set_instance ainst1 -domain_mapping {{apd1 pd1}} -model ana1
update_power_domain -name pd1 -user_attributes {amscpf_power_supply {anst1.vdd} \
amscpf_power_ground {ainst1.vss}
------------------------------------------------------------
```

FIG. 12B

```
set_cpf_version 1.1
set_hierarchy_separator.

set_design top

NORMAL CONDITION
create_nominal_condition -name high_power -voltage 2.5 -state on
create_nominal_condition -name low_power -voltage 1.8 -state on
create_nominal_condition -name off_power -voltage 0.0 -state off

#POWER DOMAIN
create_power_domain -name default_pd -default create_power_domain -name decorder_pd \
        -instances top.factor_inst1.decoder_inst1 \
        -shutoff_condition lpmc.decoder_en \
        -base_domains factor_pd \
        -active_state_conditions {low_power@pmc.decoder_en high_power@(pmc.decoder_hi} update_power_domain -name decoder_pd \
        -user_attributes {amscpf_power_supply {factor_inst1.decoder_inst1.vdd} \
        amscpf_power_ground {factor_inst1.decoder_inst1.vss}}

.......

end_design
```

FIG. 14

```
set_cpf_version 1.1
set_hierarchy_separator.

set_macro_model macro_decoder
create_power_domain -name port -boundary_parts { wl_7 wl_6 wl_5 wl_4 wl_3 wl_2 wl_1 wl_0 \
        ad_2 ad_1 ad_0 en} -default
update_power_domain -name port \
        -user_attributes {amscpf_power_supply {vdd} amscpf_power_ground {vss}}
end_macro_model macro_decoder set_design top

NORMAL CONDITION
create_nominal_condition -name high_power -voltage 2.5 -state on
create_nominal_condition -name low_power -voltage 1.8 -state on
create_nominal_condition -name off_power -voltage 0.0 -state off

#POWER DOMAIN
create_power_domain -name default_pd -default create_power_domain -name decorder_pd \
        -shutoff_condition lpmc.decoder_en \
        -base_domains factor_pd \
        -active_state_conditions {low_power@pmc.decoder_en high_power@(pmc.decoder_hi} set_instance top.factor_inst1.decoder_inst1 -model macro_decoder \
        -domain_mapping {{port decoder_pd}}

.......

end_design
```

FIG. 15

INTEGRATED CIRCUIT SIMULATION USING ANALOG POWER DOMAIN IN ANALOG BLOCK MIXED SIGNAL

BACKGROUND

The increasing complexity of systems that can be integrated on a single integrated circuit (IC) die has lead to design methodologies that allow designers to design and verify a system at an abstract or block diagram level prior to development of the detailed design of the individual design blocks. The design methodology may involve mapping a system level algorithm to a particular architecture that is partitioned into design blocks that represent sections of a circuit to be simulated and verified. A typical top down design flow for a mixed-signal integrated system may involve several distinct phases such as, system design, architecture design, cell design, and cell-layout. The performance required of individual design blocks to meet overall system performance may be evaluated through simulation and verification before details of the design blocks are fully developed.

The simulation of a mixed-signal circuit that includes both digital and analog design blocks involves two methods of simulation: event-driven digital simulation as found in logic simulators and continuous-time analog simulation as found in circuit simulators. Digital design blocks encoded in computer readable storage devices are simulated using a digital simulator, and analog blocks encoded in computer readable storage devices are simulated using an analog circuit simulator. Digital simulation and analog simulation are fundamentally different. While a digital simulator solves expressions representing logical or functional behavior of a circuit based upon the occurrence of discrete triggering events, an analog simulator solves an analog system matrix representative of Kirchhoff's Laws at each simulation step. Each element in an analog design can have an instantaneous influence on any other element in the matrix and vice versa. As such, analog simulation typically is more complex and requires matrix based computation of complex mathematical equations and therefore takes more time than digital simulation.

In the course of developing a circuit design, a designer may decide to replace a given digital version of a design block in the design with an analog version of the design block. One typical reason for replacement of a digital design block with an analog design block is to achieve more accurate simulation results. For example, a digital design block may model a circuit component at a more abstract level that provides less detail concerning the actual structure and behavior of the circuit design than does its analog counterpart. Accordingly, analog simulation using the analog design block often will provide more precise and accurate results. During full chip simulation and verification it is often a design choice as to whether to change some design blocks of the design from digital to analog so as to simulate the circuit with more accuracy to ensure better yield during subsequent manufacture of the physical circuit or to improve performance.

An important consideration in IC design is conserving power in the manufactured IC. A system may use more than one power supply voltage and may use more than one technique for power optimization. A power intent specification for an electronic circuit design is typically provided in text form and the format of a power intent specification ordinarily complies with a well recognized power intent specification format, such as the Common Power Format (CPF) or the Unified Power Format (UPF, e.g., both the Accellera UPF1.0 and IEEE 1801 aka UPF2.0) standards, for example. In general, a power intent specification is captured in a file that is associated with a schematic or block level design, which may be created using schematic capture tools, for example. Defining power intent in a separate file permits the power intent to be readily extracted from the circuit design for exporting to a user or to different processes that execute on a computer system during different stages of the overall IC design process. This allows power intent to be transferred to and incorporated into different stages of electronic design automation (EDA) flow so as to maintain continuity of power intent throughout multiple stages in the design of an IC.

A power intent specification typically is provided in a file format that is accessible by a digital simulation tool. In the past, common practice in mixed-signal simulation and verification methodology was to create a detailed design plan and goals for the digital design blocks of a circuit design and to then approximate the analog functionalities of the design by assuming simple discrete-value models of the analog blocks. Under that approach, only digital simulation was required, and low power intent expressed in a power intent specification file, therefore, could be readily used for an entire chip level simulation and verification. However, more recently, increased design complexity such as multiple feedback paths and interactions between analog and digital design blocks has required use of both digital simulation and analog simulation to accurately simulate and verify such integrated circuit systems. As explained above, this has resulted in designers changing between digital and analog versions of design blocks in the course of different simulation runs.

Various approaches have been proposed previously to apply a power intent specification associated with one or more digital simulation tools to an analog design block. A first prior approach, for example, is to use a corresponding digital design block (such as verilog/VHDL) to approximate analog functionality and to then apply the power intent specification (e.g., CPF) to the digital design block. A limitation to this first approach, explained above, is that using a digital block to approximate analog functionality will sacrifice significant accuracy in simulation and verification. In some of cases, the analog functionality cannot be represented easily by a digital design block, especially if analog behavior is a key function of the overall design. A second prior approach, for example, is to create a digital power supply signal in a digital block and then to use a connect module (CM), which typically is automatically inserted, to convert the power supply for use by an analog design block. There are several shortcomings to this second approach. For instance, a digital or system level designer typically would have to consider the power network for an analog design block at a very early stage of the design flow such as behavior level simulation. Also, additional coding may be required. Moreover, CM techniques typically do not directly support dynamic power supply in simulation. A third prior approach, for example, is to manually create an analog power source according to low power intent expressed in a low power specification file formatted for use by a digital simulator, and to then connect the power source to an analog design block to cause it to adhere to the low power intent. A limitation to this third approach is that in most cases, it is not practical to ask a digital or system level designer to create an analog power source for each analog design block that may have a dynamically changing power supply during simulation.

SUMMARY

In one aspect, a method is provided in which a circuit design that includes multiple design blocks also includes a power intent specification file that defines a power domain within the circuit design and also identifies design instances that are within the power domain and defines a control function to selectively transition the defined power domain between multiple power states. The power intent specification identifies multiple different power supply values to supply voltage to the defined power domain when the defined power domain transitions to different ones of the multiple power states. The power intent specification associates a digital circuit representation with a first identified instance within the power domain and associates an analog circuit representation with a second identified instance within the power domain. A digital simulator is used to simulate operation of the digital representation while an analog simulator is used to simulate operation of the analog representation. Simulation of the digital representation includes using the control function to simulate a transition of the defined power domain between the power states. Periodically storing in a storage location a power supply value currently in use during digital simulation of the digital representation. Using the stored currently in use power supply value as a supply voltage for the analog representation.

In another aspect, a computer system includes a processor and storage that stores machine readable code. The code represents a circuit design that includes multiple design blocks. The code includes a power intent specification file that defines a power domain within the circuit design and that identifies multiple design instances within the power domain. The power intent specification defines multiple respective supply values and a control function to selectively transition each identified power domain between supply values from among the multiple respective supply values. The circuit design indicates that at least one identified instance is a digital instance and that at least one identified instance is an analog instance. The code includes a first code portion to configure the computer system to periodically store in a storage location a supply value currently in use during digital simulation of the digital instance using a digital simulator running on the computer. The code includes a second code portion to configure the computer system to couple the currently in use value stored in the storage location to a power terminal of the identified analog instance.

BRIEF DESCRIPTION OF THE DRAWINGS

FIG. 5A is an illustrative drawing showing an example code module encoded in a computer readable storage device to implement a virtual analog power supply module using electrical discipline in accordance with some embodiments.

FIG. 5B is an illustrative drawing showing an example connect code module to connect the virtual analog power module of FIG. 5A to terminals of the analog instance identified by the code of FIG. 4 in accordance with some embodiments.

FIG. 10 is an illustrative drawing showing an example code module encoded in a computer readable storage device to implement a virtual analog power supply module using a real value in a verilog model during simulation of an analog design block within a power domain in accordance with some embodiments.

FIG. 11 is an illustrative drawing showing an example code module encoded in a computer readable storage device to implement a virtual analog power supply module using a wreal value in a verilog model during simulation of an analog design block within a power domain in accordance with some embodiments.

FIGS. 12A-12B are illustrative drawings showing example data structures representing portions of code of power intent specifications used to define a power domain that specify macro-models that include boundary ports associated with analog power attributes and that may be encoded in a file in a machine readable storage device in accordance with some embodiments.

FIG. 14 is an illustrative drawing showing a first example data structure representing a portion of code of a power intent specification used to define a power domain for an analog version of the decoder of FIG. 13 in accordance with some embodiments.

FIG. 15 is an illustrative drawing showing a second example data structure representing a portion of code of a power intent specification used to define a power domain for an analog version of the decoder of FIG. 13 in accordance with some embodiments.

DESCRIPTION OF THE EMBODIMENTS

The use of a power intent specification is explained in commonly assigned U.S. Pat. No. 7,739,629 and in commonly assigned U.S. Pat. No. 7,794,078, which are expressly incorporated herein by this reference.

Figure 1:
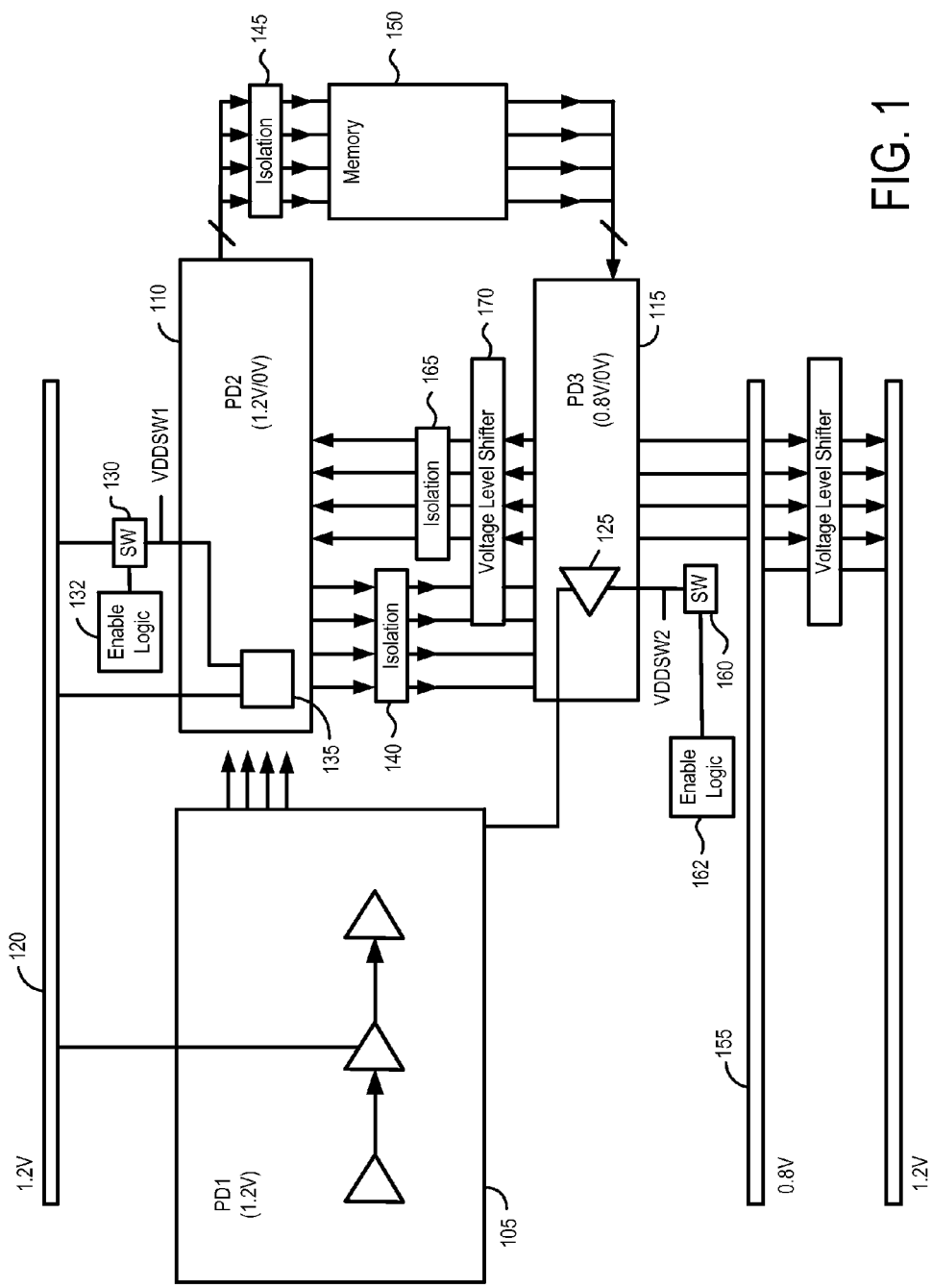
FIG. 1 is an illustrative a block diagram that shows an example circuit design that includes multiple power domains and that may be encoded in a computer readable storage device.

FIG. 1 is an illustrative a block diagram that shows an example of a circuit design that includes multiple power domains that may be encoded in a computer readable storage device. A power domain is defined in terms of circuit design blocks and components that are subject to or share the same power supply rules; although the instantaneous power may change within a given power domain, all design blocks and components within that power domain share the same instantaneous power in common. A power domain ordinarily is specified using a power intent specification, contained in a file that identifies the 'instances', e.g. design block instances, encompassed by the power domain, that specifies power modes (or states), that specifies a control function to selectively transition instances within the power domain between the different power modes, and that also may specify associated support circuitry, such as power switch cells, always-on cells, level shifter cells and isolation cells used to integrate the power-related behavior of blocks within the power domain with other circuit design components that are outside the power domain. A power intent specification indicates different power modes in terms of different power supply levels at which a power domain may operate and the conditions under which the power domain may operates at those different levels.

The example circuit design includes three power domains, PD1 105, PD2 110, and PD3 115. No power switch cell is associated with a first power domain PD1 105, which is permanently connected to power supply rail 120, and therefore, is always "on" and cannot be turned off.

An always-on gate instance 125 is encompassed within PD3 115 and receives power from two different supply domains, PD3 and PD1, also referred to as primary and secondary power domains, respectively. As long as its secondary domain is powered on, the gate 125 is always on.

First power switch cell 130 implements a control function specified by power intent specification to control transitions of power supply coupled to second power domain PD2 between a 1.2 V power supply (a powered on state) and 0V (a powered off state). First enable logic 132 implements the power mode control of PD2 through control of switching state of the first switch element 130. The enable logic 132 is implemented as circuitry that controls power mode as a function of logical values propagated during simulation, for example. The first power switch cell 130 together with first enable logic 132 assign first shutoff conditions to the second switchable power domain PD2 110. Thus, a first internal instantaneous power supply VDDSW1 associated with second power domain PD2 110 is selectively connected to power rail 120 using a power switch cell 130 according to the first shutoff conditions. The first shutoff conditions can prevent propagation of a power level from a primary power net (i.e. power rail 120) to the switchable power net VDDSW1 internal to the second power domain PD2 110. A ground switch cell (not shown), or foot switch cell, is similar except that a switchable ground net (not shown) is created instead of a switchable power net.

Power domain PD2 110 also includes a state retention cell 135 to maintain state information during any periods of time in which the power domain PD2 is powered down, i.e. when VDDSW1 is coupled to 0V. The state retention cell 135 is separately coupled to a secondary power domain through the power rail 120 so that the cell retains state even when the primary power domain PD2 in which it is contained is shutoff from the power rail 120. PD2 110 is shown connected to isolation cells, which ensure that inadvertent and unintended data is not propagated to other design blocks when the power domain is shutoff. FIG. 1 also shows isolation cells 140, 165 coupled between PD2 110 and PD3 115, and isolation cells 145 coupled between PD2 110 and a memory device design block 150.

Second power switch cell 160 implements a control function specified by power intent specification to control transitions of power supply coupled to third power domain PD3 115 between a 0.8V power rail 155 and 0V. Second enable logic 162 implements the power mode control of PD3 through control of switching state of the second switch element 160. The enable logic 162 is implemented as circuitry that controls power mode as a function of logical values propagated during simulation, for example. Thus, a second internal instantaneous power supply VDDSW2 associated with the third power domain PD3 115 is selectively connected to power rail 155 using a second power switch cell 160 according to the second shutoff conditions. The second shutoff conditions can prevent propagation of a power level from a primary power net (i.e. power rail 155) to a switchable power net VDDSW2 internal to the third power domain PD3 115.

The third power domain PD3 115 is connected to isolation cells 165 to ensure that inadvertent and unintended data is not propagated to other circuit blocks when the third power domain PD3 115 is shutoff. Level shifter cells are connected to design blocks that operate at different voltage levels. In the circuit design of FIG. 1, level shifter cells 170 are shown connected between the second power domain PD2 110, which operates at 1.2V, and the third power domain PD3 115, which operates at 0.8V.

Figure 2:
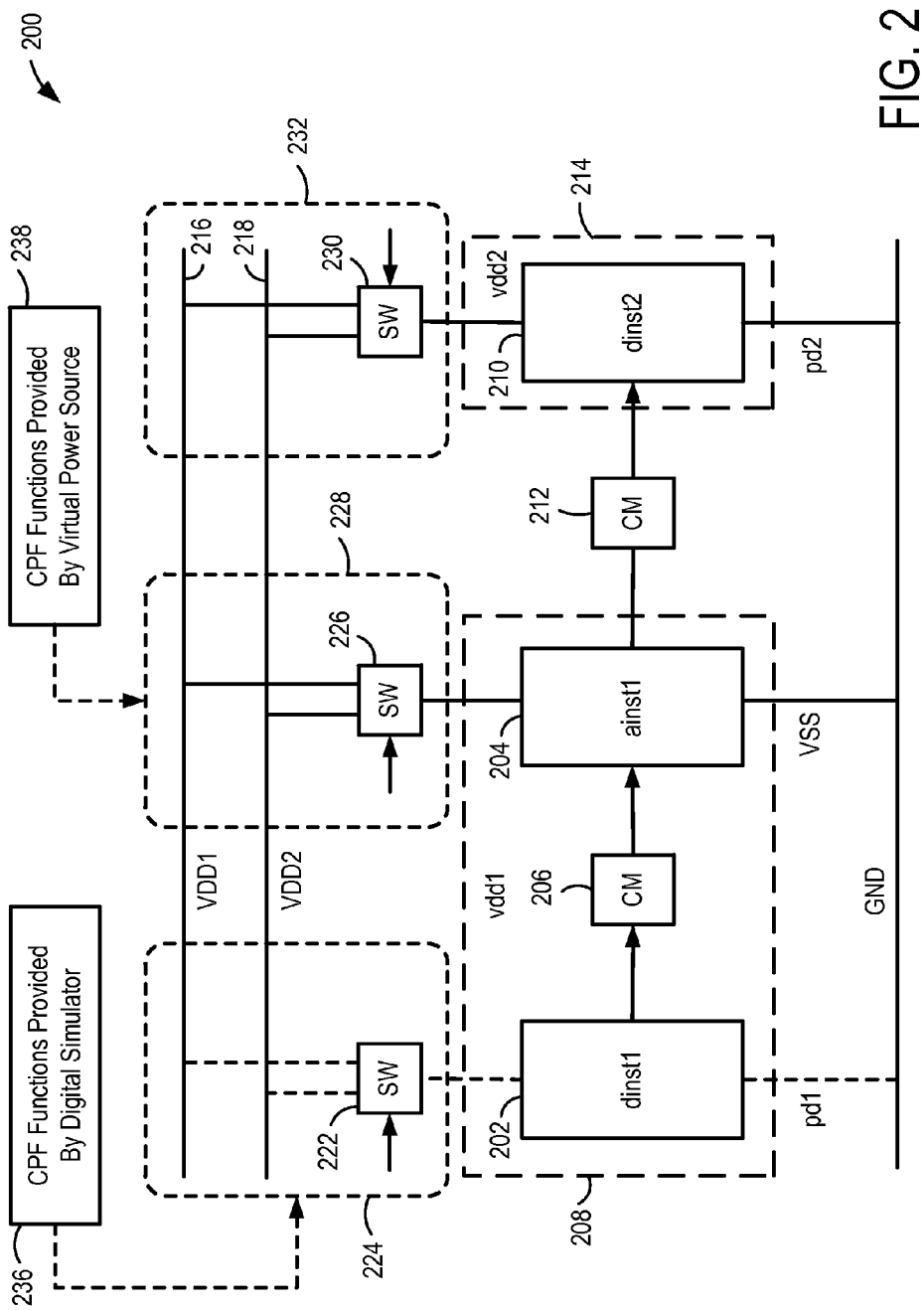
FIG. 2 is an illustrative functional block diagram representing a circuit design that includes a digital design block that is coupled to an analog design block within a power domain in accordance with some embodiments.

FIG. 2 is an illustrative functional block diagram representing a circuit design 200 that includes a digital design block that is coupled to an analog design block within a power domain in accordance with some embodiments. The circuit design 200 is encoded in a machine readable storage device. A first design block 202 in the circuit design 200 is associated with a first digital circuit design instance (dinst1). A second design block 204 in the circuit design 200 is associated with a first analog design instance (ainst1). It will be appreciated that circuit components within a design may correspond to and be instances of library cell elements, and that cell instances may be inserted into design blocks within a design. Cell instances are referred to herein as 'instances'. A first connect module 206 couples the first digital circuit design instance (dinst1) within the first design block 202 with the first analog design instance (ainst1) within the second design block 204. In general, a connect module acts during simulation to transform discrete domain information used by a digital design instance to the continuous domain used by an analog design instance or vice versa. Connect modules are a special form of a mixed-signal module which allow accurate modeling of the interfaces between analog and digital blocks. They help ensure the drivers and receivers of a connect module are correctly handled so the simulation results are not impacted. A third design block 210 is associated with a second digital design instance (dist2). A second connect module 212 couples the first analog instance (ainst1) within the second design block 204 with the second digital design instance (dinst2) within the third design block 210.

The circuit design 200 includes a first supply voltage VDD1 216 and a second supply voltage VDD2 218 and includes a ground voltage GND. A first power domain (pd1) 208 encompasses the first design block 202, the second design block 204 and the connect module 206. The first power domain 208 is associated with an internal instantaneous supply voltage vdd1 pd1 and a constant or fixed ground voltage vsspd1. More particularly, the first power domain is associated with a digital internal instantaneous supply voltage vdd1 digi and with an analog internal instantaneous supply voltage $vdd1_{ana}$.

A first power switch cell 222, which implements a control function specified by power intent specification, is operatively coupled to selectively transition the first design block 202 that is associated with the first digital instance (dinst1) between the first supply voltage VDD1 and the second supply voltage VDD2. More particularly, the first power switch cell 222 transitions between a first state in which it couples the digital internal supply voltage $vdd1_{digi}$ associated with the first digital instance (dinst1) to the first supply voltage VDD1 and a second state in which it couples the digital internal instantaneous supply voltage $vdd1_{digi}$ associated with the first digital instance (dinst1) to the second supply voltage VDD2. The switching state of the first power switch cell 222 is determined by control circuitry (not shown) that implements enable functions specified in a power intent specification 236. During simulation, a digital circuit simulator (not shown) accesses the power intent specification to control the state of the first power switch cell 222. Details of the enable functions are unimportant, and a person skilled in the art will readily understand how to make and use a power intent specification. Dashed lines 224 indicate control circuitry (not shown) that corresponds to and is derived from the power intent specification to control switch 222. Enable functions may be represented by program code that causes the first power switch cell 222 to change states as a function of signals propagated within design blocks of the circuit design 200.

A second power switch cell 226, which is implemented as a virtual analog power supply consistent with the power intent specification as described more fully below, is operatively coupled to selectively transition the second design block 204 that is associated with the first analog instance (ainst1) between the first supply voltage VDD1 and the second supply voltage VDD2. Specifically, the second power switch cell 226 transitions between a first state in which it couples the analog internal instantaneous supply voltage $vdd1_{ana}$ associated with the first analog instance (ainst1) to the first supply voltage and a second state in which it couples the analog internal supply voltage $vdd1_{ana}$ associated with the first analog instance (ainst1) to the second supply voltage VDD2 Dashed lines 228 and control switch 226 correspond to a virtual analog power supply described more fully below. During simulation, an analog simulator (not shown) accesses a value of the digital internal instantaneous supply voltage $vdd1_{digi}$ and uses that supply voltage to produce a virtual instantaneous power source supply voltage $vdd1_{ana}$ 238 that that is consistent with the digital instantaneous supply voltage.

A second power domain (pd2) 214 encompasses the third design block 214. The second power domain 214 is associated with an internal instantaneous supply voltage $vdd2_{digi}$ and a constant or fixed ground voltage $vss_{pd1}$. A third power switch cell 230 is operatively coupled to selectively transition the third design block 210 that is associated with the second digital instance (dinst2) between the first supply voltage VDD1 and the second supply voltage VDD2. The third switch cell is controlled by a digital simulator based upon contents of a power intent specification. Details of the operation of the second power domain pd2 214 will be appreciated from the description above. Dashed lines 232 indicate that control circuitry (not shown) that corresponds to and is derived from the power intent specification to control switch 230.

In the course of simulation and verification of a circuit design that includes a plurality of design blocks, a 'checker boarding' process may be employed in which an analog circuit version of a design block is inserted into a design block of the circuit design while other design blocks are associated with digital design block versions. The circuit design then is simulated using digital and analog simulation tools. Next, an analog circuit version of a different design block is inserted into the circuit design; the previously inserted analog version is replaced by a digital version; and other design blocks of the circuit design are associated with digital design versions. The circuit is simulated with this different combination of analog and digital design block versions. The process of changing the one or more design blocks in the circuit design where an analog design is inserted, followed by simulation, continues until the circuit design has been adequately simulated. With this approach to simulation, individual simulation runs can be performed more rapidly since only one or a few design blocks are subject to the more time consuming analog simulation during each run and over the course of several simulation runs, detailed analog simulation of a plurality of design blocks can be achieved, for example.

It will be appreciated that a power intent specification language such as one consistent with IEEE 1801 is commonly used to describe the power supply to a given block. This approach works very well when design block in question is digital in nature such that an event driven simulator can accurately simulate the power supply using the power intent specification language. However, when an analog representation of design block functionality is substituted in place of a digital design block representation of design block functionality in the course of a checker boarding approach to simulation, for example, an analog simulator (e.g., SPICE) (as opposed to an event driven simulator) is used to for functional simulation of this block, and the power intent specification for this block is not useable by the analog simulator, since analog simulators generally do not understand how to simulate a power intent specification aimed at use by a digital simulator. This is one reason why, in accordance with some embodiments, a virtual analog power supply model is produced as a function of the power intent specification such that the characteristics of the power supply module for this (now) analog block are consistent with the power supply characteristics that would have resulted if the digital design block representation was incorporated in the design and used the power intent specification to describe the power supply.

The following description explains three approaches to creating a virtual analog power supply model. One uses "electrical" discipline of the Verilog-AMS language. The second uses variables of "real" data type as defined in the Verilog language. The third method uses the "wreal" data type as defined in the Verilog-AMS language. Under each approach, a virtual power supply module is created from the power intent specification (using a standard power intent specification language such as one specified in IEEE1801 such as CPF) for a given block. This virtual power supply module will be simulated by an analog simulator and will produce the same, consistent power characteristics of the block compared to the case when this block had a digital representation and its power supply was specified using a power intent specification language such as one specified in IEEE1801.

Of course, real, wreal and electrical all provide a continuous value that is used to describe the behavior of an object that is analog in nature. The electrical discipline is part of the Verilog-AMS language and is used to describe the characteristics of a conservative system. However, a simulation using real variables does not necessarily use a continuous time solver. A real valued variable simply acts as a state bearing object (such as a variable in a C program). The wreal net type, which is defined in the Verilog-AMS language represents a real value bearing net that is simulated by an event driven solver. Simulations using wreal type are usually much faster because of their event driven nature, but are usually less accurate when compared to one involving electrical disciplines.

In the following description, it will be appreciated that the type of the object (real, electrical, wreal) typically dictates the choice of the analog simulator. Thus, in some cases in accordance with some embodiments, an event driven simulator is used, and a wreal or real data type based implementation of a virtual analog power supply model will be used). In other cases in accordance with other embodiments, a continuous time simulator, and an electrical discipline and real data type based implementation of a virtual analog power supply model will be used.

Figures 3, 4:
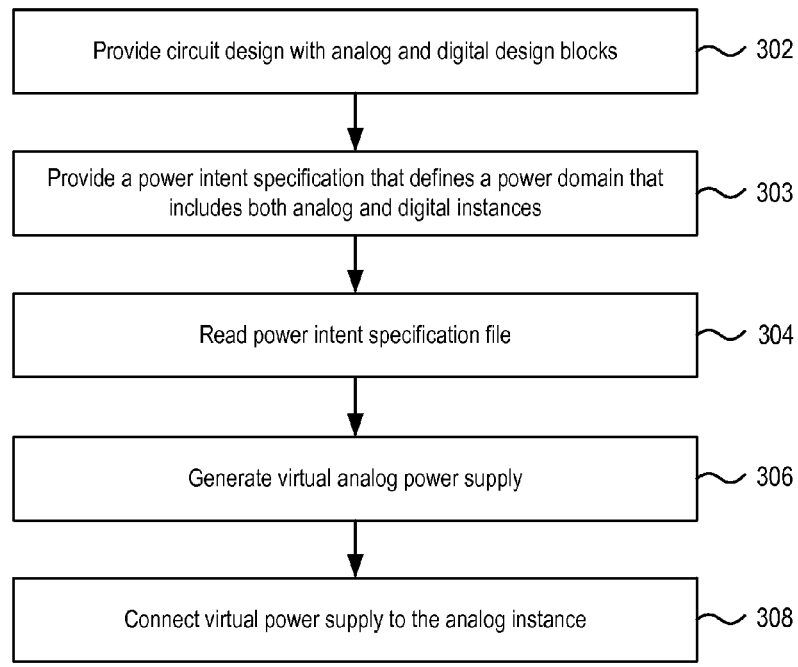
FIG. 3 is an illustrative flow diagram of a process to use an instantaneous power supply voltage associated with a digital block of a power domain to create a virtual analog power supply voltage associated with an analog block of the power domain in accordance with some embodiments.
FIG. 4 is an illustrative drawing showing an example data structure representing a portion of code of a power intent specification in accordance with some embodiments.

FIG. 3 is an illustrative flow diagram of a process 300 to use an instantaneous power supply voltage associated with a digital block of a power domain to create a virtual analog power supply voltage associated with an analog block of the power domain in accordance with some embodiments. Modules in the flow diagram correspond to computer program code that configures a computer system to implement the acts specified with reference to the modules. In module 302, a circuit design is provided that includes a digital block and an analog block that are both associated with the same power domain. In module 303, a power intent specification is provided in a machine readable storage device that defines a power domain that includes both analog and digital instances. Module 304 accesses the power intent specification associated with the power domain. Module 306 creates a virtual analog power source for the analog block as a function of the information obtained from the power intent specification. Module 308 couples the virtual analog power source to the analog block within the design.

A detailed example of the process 300 of FIG. 3 will be provided with reference to the circuit design of FIG. 2. For the purpose of this explanation, assume that the second design block 204 previously was associated with a digital instance (not shown), and that now, a user has associated with the second design block 204 with the first analog design instance (ainst1) shown in FIG. 2. In addition, assume that a power intent specification associated with the first power domain pd1 has been updated to include reference to analog attributes associated with the first analog design instance (ainst1).

FIG. 4 is an illustrative drawing showing an example data structure representing a portion of code of a power intent specification used to define a power domain that specifies both a digital instance and an analog instance and that specifies corresponding analog power supply and power ground attributes that may be encoded in a file in a machine readable storage device in accordance with some embodiments. It will be appreciated that the power intent specification may contain additional information, which is not shown in order to simplify and not overcomplicate the description herein.

The example power intent specification includes an update_power_domain command that sets forth an analog design power supply parameter, amscf_power_supply and an analog design ground parameter, amscf_power_ground. In this example the analog power supply design attribute ainst1.vdd is associated with the analog power supply parameter, and the analog ground design attribute ainst1.vss is associated with the analog design ground parameter. In some embodiments, a computer program commonly referred to as an elaborator configures a computer system to generate a virtual analog power source module in response to the analog design power supply and ground parameters as described below.

In general, a parser parses a high level design language representation of a circuit design including the power intent specification file and passes information to the elaborator module. Elaboration typically involves activities such as, for example, expanding module instantiations, computing parameter values, resolving hierarchical names establishing net connectivity, and in general, preparing a design for simulation. As explained above, design blocks in a circuit design may be represented abstractly, and some design blocks may be associated with analog design versions while others are associated with digital design versions. Design blocks within a circuit design are connected by nets, and during elaboration, signal types associated with nets connecting various design blocks are determined. For each such component design block, the elaboration process determines signals that correspond to nets and ports of the design block.

FIG. 5A is an illustrative drawing showing an example code module encoded in a computer readable storage device to implement a virtual analog power supply module using electrical discipline for use during simulation of an analog block within a power domain in accordance with some embodiments. More particularly, the virtual analog power supply module is used during simulation of the analog instance identified by the code of FIG. 4 using power supply information obtained during simulation of the digital instance identified by the code of FIG. 4 in accordance with some embodiments.

The statement, $lps_link_power_domain_voltage(rvdd1, "top.pd1"); returns the current internal instantaneous supply voltage of the power domain top.pd1, and stores the returned internal instantaneous supply voltage in real value rvdd1. an event-driven simulator that understands how to process power-intent specification can implement the system task named $lps_link_power_domain_voltage( )" provides this functionality: basically it takes two arguments—a real variable named rvdd1 and the name of a power domain (top.pd1 in this example). Once these two arguments are provided, the system task fetches the voltage from the power domain and assigns that value to the real variable. It will be appreciated that the returned internal instantaneous power supply voltage is the current operating voltage of the digital instance identified in the example code of FIG. 4 that shares the power domain top.pd1 with the analog instance that corresponds to the analog supply module of FIG. 5A. The instantaneous power supply changes from time to time between VDD1 and VDD2 dependent upon the control circuitry (not shown) specified by the power intent specification.

The statement, V(avdd1)<+transition(rvdd1); is a contribution statement that indicates that the electrical net associated with analog supply terminal avdd1 is the transition of the real value stored at rvdd1. Thus, the analog power supply voltage avdd1 during analog simulation of the analog instance ainst1 using an analog simulator is linked to the current internal digital power supply value vdd1 of the shared power domain pd1 generated during digital simulation of the digital instance dinst1 using a digital simulator.

The statement, V(avss1)<+0; is a contribution statement that indicates that the electrical net associated with analog ground terminal avss1 is 0.

FIG. 5B is an illustrative drawing showing an example connect code module to connect the virtual analog power module of FIG. 5A to terminals of the analog instance identified by the code of FIG. 4 in accordance with some embodiments.

In the statement, connect cds_amscpf_pd_link.avdd1 top.ainst1.vdd, the module named connect cds_amscpf_pd_link causes a computer system to configure to connect the voltage avdd1 top specified in the example power supply module code of FIG. 5A to the analog terminal ainst1.vdd specified in example the power intent specification code of FIG. 4.

In the statement, connect cds_amscpf_pd_link.avss1 top.ainst1.vss, the module named connect cds_amscpf_pd_link causes a computer system to configure to connect the voltage avss1 top specified in the example power supply module code of FIG. 5A to the analog terminal ainst1.vss specified in example the power intent specification code of FIG. 4.

Figure 6:
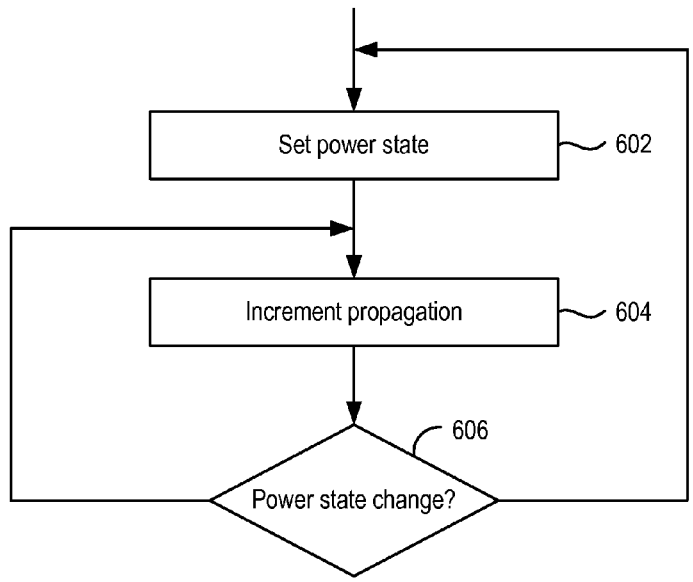
FIG. 6 is an illustrative flow diagram of aspects of a digital simulation process in accordance with some embodiments.

FIG. 6 is an illustrative flow diagram of aspects of a digital simulation process 600 in accordance with some embodiments. Modules in the flow diagram correspond to computer program code that configures a computer system to implement the acts specified with reference to the modules. The explanation is made with reference to the first power domain 208 of the circuit design of FIG. 2 although it is applicable to circuit designs in general. Internal instantaneous power associated with the first digital instance (dinst1) inserted in the first design block 202 is determined in module 602 based upon power intent specification and the state of signals propagating within the circuit design. Incremental signal propagation within the overall circuit design 200 is performed using module 604. Decision module 606 determines whether there is a change to the internal instantaneous power associated with the first digital instance (dinst1). If 'yes', then control flows back to module 602, and an updated internal instantaneous power is determined for (dinst1). If 'no', then control flows back to module 604.

Figure 7:
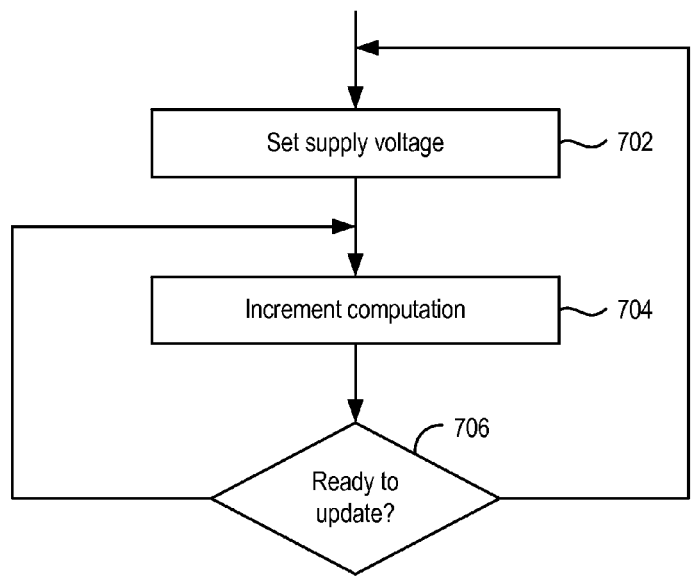
FIG. 7 is an illustrative flow diagram of aspects of an analog circuit simulation process in accordance with some embodiments.

FIG. 7 is an illustrative flow diagram of aspects of an analog circuit simulation process 700 in accordance with some embodiments. Modules in the flow diagram correspond to computer program code that configures a computer system to implement the acts specified with reference to the modules. The explanation is made with reference to the first power domain 208 of the circuit design of FIG. 2 although it is applicable to circuit designs in general. Internal instantaneous power supply associated with the first analog instance (ainst1) inserted in the second design block 204 is determined in module 702 based upon the present internal instantaneous voltage supply level associated with the first digital instance (dinst1). As explained with reference to FIG. 5A, in this illustrative example, the internal instantaneous digital supply voltage is stored as a real value rvdd1. Module 704 configures a computer system to conduct incremental computations in furtherance of simulation of the overall circuit design 200. Decision module 706 periodically checks to determine whether the instantaneous supply voltage associated with dinst1 has changed. If 'yes', then control flows to module 702, and a new instantaneous virtual analog supply voltage is obtained. If 'no', then module 704 proceeds with incremental computation using the previously obtained instantaneous virtual analog supply voltage.

Figure 8:
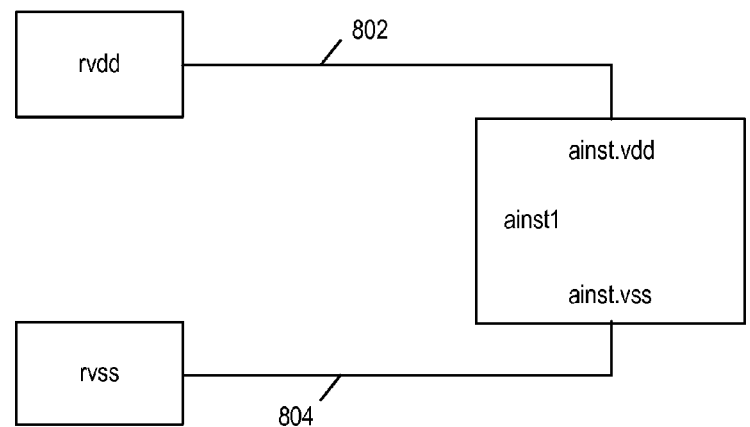
FIG. 8 is an illustrative diagram representing structures implemented in code stored in a machine readable storage device showing a relationship among the first analog instance of FIG. 2 and example real values associated with the instantaneous power supply of the first digital instance of the circuit design of FIG. 2 in accordance with some embodiments.

FIG. 8 is an illustrative diagram representing structures implemented in code stored in a machine readable storage device showing a relationship among the first analog instance and real values associated with the instantaneous power supply associated with the first digital instance of the circuit design of FIG. 2 in accordance with some embodiments. A real value rvdd representing instantaneous digital supply is coupled via an electrical net 802 to a instantaneous analog power terminal avdd1 of the first analog instance ainst1. A real value rvss representing instantaneous digital ground is coupled via an electrical net 804 to a instantaneous analog ground terminal avss1 of the first analog instance ainst1.

Figure 9:
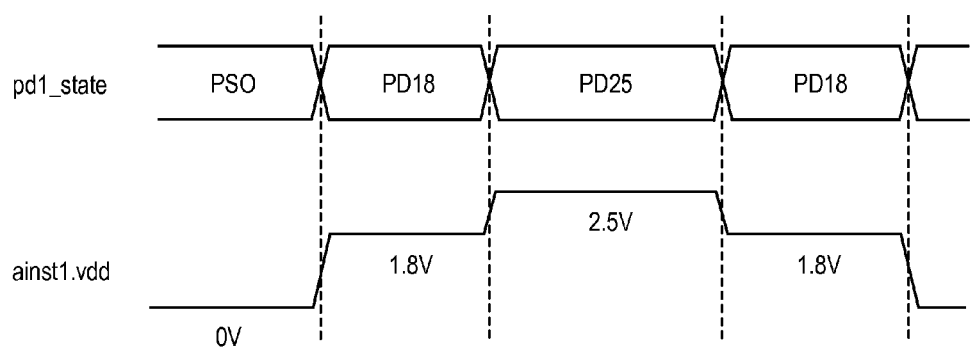
FIG. 9 is an illustrative drawing showing example relationship between analog power supply voltage and power domain state in accordance with some embodiments.

FIG. 9 is an illustrative drawing showing example relationship between analog power supply voltage and power domain state in accordance with some embodiments. In a power shut-off state (PSO), the virtual supply voltage level attribute ainst1.vdd1 is 0V. In a PD18 state, the virtual supply voltage level attribute is 1.8V. In a PD25 state, the virtual supply voltage level attribute is 2.5V.

FIG. 10 is an illustrative drawing showing an example code module encoded in a computer readable storage device to implement a virtual analog power supply module using a real value in a verilog model during simulation of an analog design block within a power domain in accordance with some embodiments.

FIG. 11 is an illustrative drawing showing an example code module encoded in a computer readable storage device to implement a virtual analog power supply module using a wreal port in a verilog model during simulation of an analog design block within a power domain in accordance with some embodiments. Persons skilled in the art will appreciate that simulation using a wreal net discipline involves event driven simulation in which computation of values is triggered by a change in some wreal value beyond some tolerance, for example. In this manner, a pseudo-continuous simulation is achieved that runs faster than purely continuous simulation using electrical values and that is more accurate than digital simulation. Analog simulation engines that use the wreal discipline typically are not configured to utilize information from a power intent specification. Accordingly, the processes described herein with respect to creating and using virtual power supplies also are applicable to analog design blocks using the wreal discipline.

An important difference between FIG. 10 and FIG. 11 is that for FIG. 10, top.ainst1.vdd is of real data type requiring us to use the always @(rvdd1 )top.ainst 1.vdd=rvdd1; syntax. In FIG. 11, on the other hand, top.ainst1.vdd is of wreal data type, and therefore we need to use the assign top.ainst1.vdd=rvdd1; syntax. In both cases, the right-hand side, rvdd1 , is a variable of real data type.

Macro-models are used as design blocks in some circuit designs. Often, only boundary ports of a macro-model are available to the designer. The internal details of the macro-model, which sometimes is referred to as a 'black box' are undisclosed. Attributes can be associated with these input/output boundary ports.

FIGS. 12A-12B are illustrative drawings showing example data structures representing portions of code of power intent specifications used to define a power domain that specify macro-models that include boundary ports associated with analog power attributes and that may be encoded in a file in a machine readable storage device in accordance with some embodiments. In this illustrative example, the power intent specification is represented using the Common Power Format (CPF) language. In FIG. 12A, the attributes amscpf_power_supply and amscpf_power_ground are specified inside the macro-model definition, and therefore are specified as the power net as "vdd" inside the scope of the macro model. In FIG. 12B, the attributes amscpf_power_supply and amscpf_power_ground are specified outside the macro model definition and so the same net "vdd" is now specified using the complete path, viz.ainst1.vdd, where "ainst1" is the instance of the macro model "ana1".

Figure 13:
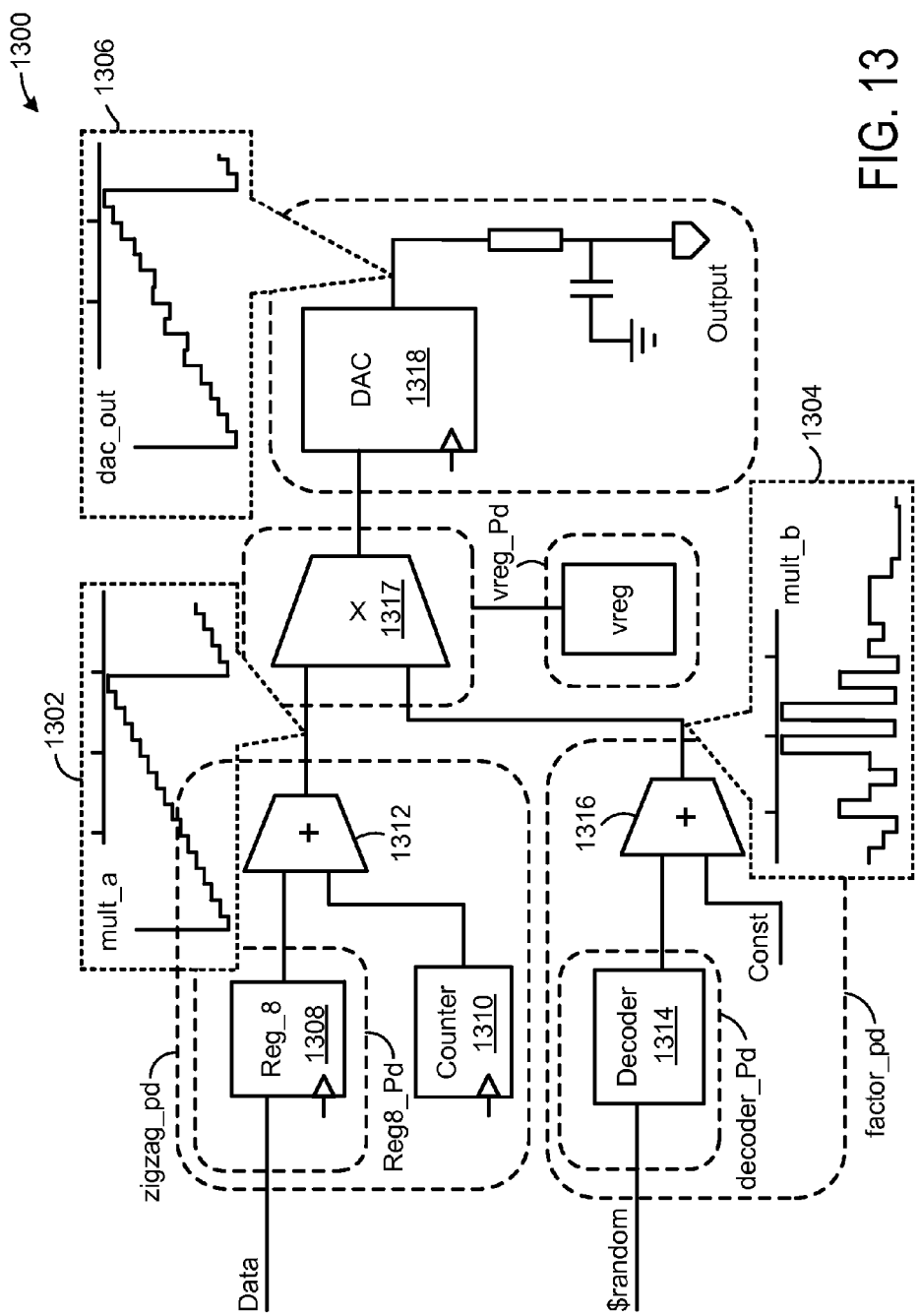
FIG. 13 is an illustrative drawing showing an example circuit design that includes multiple design blocks and multiple power domains in accordance with some embodiments.

FIG. 13 is an illustrative drawing showing an example circuit design 1300 that includes multiple design blocks and multiple power domains in accordance with some embodiments. The circuit design 1300 represents a saw-teeth waveform generator with digital noise. Details of the operation of the example circuit design 1300 are not important and will not be described further except where relevant to explain pertinent principles. The circuit design 1300 includes two power supplies, 1.8V and 2.5V (not shown). The circuit design 1300 includes multiple power domains: zigzag_pd; reg8_pd; mux_pd; DAC-pd; vreg_pd; factor_pd; and decoder_pd. An example of the count-up behavior of the circuitry within the zigzag_pd is represented by signal mult_a in the graph 1302. An example of the noise factor output of the circuitry of the factor_pd is represented by signal mult_b in the graph 1304.

An example of the analog output of the circuitry of the DAC_pd is represented by signal dac_out in the graph 1306.

The zigzag_pd domain includes an 8-bit register 1308 and a counter 1310, whose outputs are combined as indicated adder 1312 to generate a count-up number, 'mult_a'. The factor_pd domain includes a 3-to-8 decoder 1314, which produces a number that is added const number as indicated by adder 1316 to generate a noise factor, such as 1.0XX, signal 'mult_b'. Signal 'mult_a' is multiplied with 'mult_b', as indicated by multiplier 1317 and the result 'mult_out' is sent to DAC 1318. Through the DAC 1318, the digital count-up number with noise is converted to analog saw-teeth waveform.

Now, for example, assume that the decoder 1314 is changed from a digital design block to an analog design block such as a Verilog-AMS module or an implemented transistor level SPICE/Spectre model, and that a low power intent from a power intent specification (e.g., CPF or UPF) on this block is still required.

FIG. 14 is an illustrative drawing showing a first example data structure representing a portion of code of a power intent specification used to define a power domain for an analog version of the decoder 1314 of FIG. 13 in accordance with some embodiments. The power domain decoder_pd is derived from a 'base' power domain factor_pd and inherits attributes of the factor_pd as indicated by the statement base_domains factor_pd. The power intent specification includes the update_power domain command described above and defines power supply and ground supply for the decoder 1314 within the decoder_pd. An analog power supply is generated as described above. Persons skilled in the art will appreciate that creation of a new power domain for the analog version of decoder 1314 allows insertion of a different (analog) instance that inherits from the factor_pd without changing the factor_pd itself. More particularly, such new power domain is created to specify power characteristics that are largely similar to the base power domain, but can contain some variations. Note that in this example, the new power domain is just a regular power domain specification. In the case when top.factor_inst1.decoder_inst1 is described using analog representation, the attributes amscpf_power_supply and amscpf_ power_ground are used. In the other case when top.factor_inst1.decoder_inst1 is described using digital representation, those attributes are ignored and the other features of a decode_pd specification are used. However, in both cases the power behavior of top.factor_inst1.decoder_inst1 should be consistent.

FIG. 15 is an illustrative drawing showing a second example data structure representing a portion of code of a power intent specification used to define a power domain for an analog version of the decoder 1314 of FIG. 13 in accordance with some embodiments. FIGS. 14 and 15 differ is that FIG. 15 uses a macro model while FIG. 14 does not.

Hardware Embodiment

Figure 16:
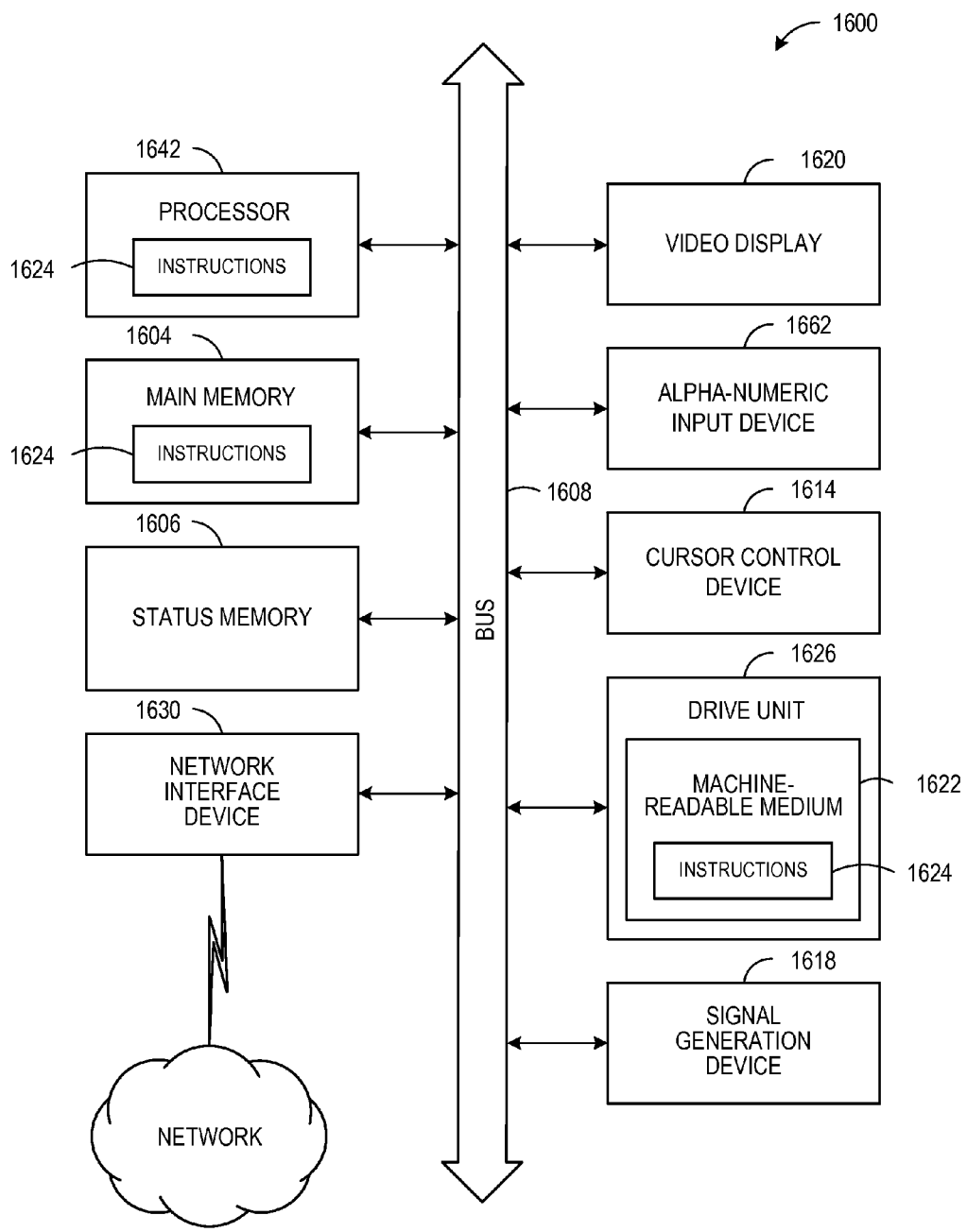
FIG. 16 is an illustrative block diagram of a computer processing system to perform any one or more of the methodologies discussed herein in accordance with some embodiments.

FIG. 16 is a block diagram of a computer processing system within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. In a networked deployment, the computer may operate in the capacity of a server or a client computer in a server-client network environment, or as a peer computer in a peer-to-peer (or distributed) network environment.

While only a single computer is illustrated, the term "computer" shall also be taken to include any collection of computers that individually or jointly execute a set (or multiple sets) of instructions to perform any one or more of the methodologies discussed herein.

The example computer processing system 1600 includes processor 1642 (e.g., a central processing unit (CPU), a graphics processing unit (GPU) or both), main memory 1604 and static memory 1606, which communicate with each other via bus 1608. The processing system can be configured, for example, to implement the process of FIG. 3. The processing system 1600 may further include video display unit 1620 (e.g., a plasma display, a liquid crystal display (LCD) or a cathode ray tube (CRT)). The display can be used to display code listings within a log file indicative of UI events, for example. The processing system 1600 also includes alphanumeric input device 1662 (e.g., a keyboard), a user interface (UI) navigation device 1614 (e.g., a mouse, touch screen, or the like), a disk drive unit 1616, a signal generation device 1618 (e.g., a speaker), and a network interface device 1630.

The disk drive unit 1626 includes computer-readable medium 1622 on which is stored one or more sets of instructions and data structures (e.g., software 1624) embodying or utilized by any one or more of the methodologies or functions described herein. The software 1624 may also reside, such as that used to configure a computer system to implement processes associated with the modules of FIGS. 4-5B, 10-15, completely or at least partially, within a computer readable storage device such as the main memory 1604 and/or within the processor 1642 during execution thereof by the processing system 1600, the main memory 1604 and the processor 1642 also constituting computer-readable, tangible media.

While the computer-readable medium 1622 is shown in an example embodiment to be a single medium, the term "computer-readable storage device" should be taken to include a single device or multiple devices (e.g., a centralized or distributed database, and/or associated caches and servers) that store the one or more sets of instructions. The term "computer-readable device" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable device" shall accordingly be taken to include, but not be limited to, solid-state memories, and optical and magnetic media.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method comprising:
providing in a non-transitory computer readable storage device a circuit design that includes multiple design blocks;
providing in the non-transitory computer readable storage device a power intent specification file that defines a power domain within the circuit design and that identifies design instances within the power domain and that defines a control function to selectively transition the defined power domain between multiple respective power supply values;
associating a digital circuit representation with a first identified instance within the power domain;
associating an analog circuit representation with a second identified instance within the power domain;
using a digital simulator to simulate operation of the digital representation while using an analog simulator to simulate operation of the analog representation;
wherein simulating operation of the digital representation includes using the control function to simulate a transition of the defined power domain between supply values from among the multiple respective supply values;
within a virtual analog power supply module consistent with the power intent specification file, periodically storing in a storage location a power supply value currently in use during digital simulation of the digital representation; and
using the stored currently in use power supply value to produce a virtual instantaneous power supply voltage as a supply voltage to the analog representation during simulation of the analog representation.

2. The method of claim 1 further including:
wherein storing the currently in use value of the supply voltage represented includes storing the voltage of a net having an electrical discipline.

3. The method of claim 1 further including:
wherein storing the currently in use value of the supply voltage represented includes storing as a real value.

4. The method of claim 1 further including:
wherein storing the currently in use value of the supply voltage represented includes storing as a value of a net of wreal type.

5. The method of claim 1 further including:
associating the currently in use value stored in the storage location with a net associated in the computer readable storage device with a power supply terminal of the analog representation;
wherein using the stored currently in use power supply value to supply voltage to the analog representation includes determining a value associated with the net.

6. The method of claim 1,
wherein periodically storing in a storage location a power supply value includes:
during simulation of the digital representation, storing a currently in use value of the supply voltage in a power supply storage location within the non-transitory computer readable storage device;
during simulation of the digital representation, storing a currently in use value of a ground voltage in a ground supply storage location within the non-transitory computer readable storage device.

7. The method of claim 1,
wherein periodically storing in a storage location a power supply value includes:
during simulation of the digital representation, storing a currently in use value of the power supply voltage in a power supply storage location within the non-transitory computer readable storage device;
associating the currently in use supply voltage value stored in the storage location with a power supply voltage net associated in the computer readable storage device with a power supply terminal of the analog representation;
during simulation of the digital representation, storing a currently in use value of a ground voltage in a ground supply storage location within the non-transitory computer readable storage device;
associating the currently in use ground voltage stored in the storage location with a ground voltage net associated in the computer readable storage device with a ground voltage terminal of the analog representation.

8. The method of claim 1,
wherein the multiple respective power supply values include a first power supply value and a second power supply value;
wherein a first power supply value is used during digital simulation to supply voltage to the defined power domain when the defined power domain is in the first power state;
wherein a second power supply value is used during digital simulation to supply voltage to the defined power domain when the defined power domain is in the second power state.

9. The method of claim 1,
wherein the power intent specification file defines a base domain that encompasses the defined domain.

10. The method of claim 1 further including:
creating a connect module in the computer readable storage device to couple the digital representation and the analog representation during simulation.

11. An article of manufacture that includes a non-transitory computer readable storage device encoded with instructions to cause the computer to perform a process that includes:
providing in the non-transitory computer readable storage device a circuit design that include multiple design blocks;
providing in the non-transitory computer readable storage device a power intent specification file that defines a power domain within the circuit design and that identifies design instances within the power domain and that defines a control function to selectively transition the defined power domain between multiple respective supply values;
associating a digital circuit representation with a first identified instance within the power domain;
associating an analog circuit representation with a second identified instance within the power domain;
using a digital simulator to simulate operation of the digital representation while using an analog simulator to simulate operation of the analog representation;
wherein simulating operation of the digital representation includes using the control function to simulate a transition of the defined power domain between supply values from among the multiple respective supply values;
within a virtual analog power supply module consistent with the power intent specification file, periodically storing in a storage location a power supply value currently in use during digital simulation of the digital representation; and
using the stored currently in use power supply value to produce a virtual instantaneous power supply voltage as a supply voltage to the analog representation during simulation of the analog representation.

12. The article of claim 11 further including:
associating the currently in use value stored in the storage location with a net associated in the computer readable storage device with a power supply terminal of the analog representation;
wherein using the stored currently in use power supply value to supply voltage to the analog representation includes determining a value associated with the net.

13. The article of claim 11,
wherein the multiple respective power supply values include a first power supply value and a second power supply value;
wherein a first power supply value is used during digital simulation to supply voltage to the defined power domain when the defined power domain is in the first power state;
wherein a second power supply vale is used during digital simulation to supply voltage to the defined power domain when the defined power domain is in the second power state.

14. A computer system that includes a processor and non-transitory storage device coupled to the processor that stores machine readable code comprising:
a circuit design that includes multiple design blocks;
a power intent specification file that defines a power domain within the circuit design and that identifies multiple design instances within the power domain, defines multiple respective supply values and that defines a control function to selectively transition each identified power domain between supply values from among the multiple respective supply values;
wherein the circuit design indicates that at least one identified instance is a digital instance and that at least one identified instance is an analog instance;
a first code portion to configure the computer system to periodically store, in a storage location within a virtual analog power supply module consistent with the power intent specification file, a supply value currently in use during digital simulation of the digital instance using a digital simulator running on the computer; and
a second code portion to configure the computer system to use the stored currently in use power supply to produce a virtual instantaneous power supply voltage as a supply voltage and to couple the supply voltage to a power terminal of the identified analog instance.

15. The system of claim 14,
wherein configuring the computer system to periodically store the supply value currently in use includes storing the currently in use value of the supply value as an electrical value.

16. The system of claim 14,
wherein configuring the computer system to periodically store the supply value currently in use includes storing the currently in use value of the supply value as a real value.

17. The system of claim 14,
wherein configuring the computer system to periodically store the supply value currently in use includes storing the currently in use value of the supply value as a real value.

18. The system of claim 14,
wherein coupling the currently in use value stored in the storage location to a power terminal of the identified analog instance includes associating the storage location that stores the currently in use value with a net associated in the computer readable storage device with a power supply terminal of the analog representation.

19. The system of claim 14,
wherein the multiple respective supply values include a first power supply value and a second power supply value;
wherein the first supply value is used during simulation of the circuit design to supply voltage to the defined power domain when the defined power domain is in the first power state;
wherein second supply value used during simulation of the circuit design to supply voltage to the defined power domain when the defined power domain is in the second power state.

20. The system of claim 14,
wherein the power intent specification includes the first code portion.

21. The system of claim 14,
wherein the power intent specification includes the first code portion and the second code portion.

* * * * *